(12) United States Patent
Ruijter et al.

(10) Patent No.: US 9,168,858 B2
(45) Date of Patent: Oct. 27, 2015

(54) TWO OR THREE WIND TURBINE BLADES AS ONE UNIT

(71) Applicant: Envision Energy (Denmark) ApS, Silkeborg (DK)

(72) Inventors: Wout Ruijter, Silkeborg (DK); Jan Westergaard, Brande (DK)

(73) Assignee: Envision Energy (Denmark) APS, Silkeborg (DE)

( * ) Notice: Subject to any disclaimer, the term of this patent is extended or adjusted under 35 U.S.C. 154(b) by 0 days.

(21) Appl. No.: 14/193,303

(22) Filed: Feb. 28, 2014

(65) Prior Publication Data
US 2014/0248112 A1    Sep. 4, 2014

(30) Foreign Application Priority Data
Mar. 1, 2013 (DK) .................................. 2013 70122

(51) Int. Cl.
*B60P 7/08* (2006.01)
*B60P 7/06* (2006.01)
*B60P 3/40* (2006.01)

(52) U.S. Cl.
CPC .... *B60P 7/06* (2013.01); *B60P 3/40* (2013.01)

(58) Field of Classification Search
CPC ............... B60P 3/40; B60P 7/12; B60P 7/06; B65D 2585/64; F03D 1/005; F05B 2260/02
USPC .............................. 410/33, 34, 35, 44, 45, 53
See application file for complete search history.

(56) References Cited

U.S. PATENT DOCUMENTS

| 8,511,921 B2 | 8/2013 | Riddell et al. |
| 2010/0143062 A1 * | 6/2010 | Tobergte ........................ 410/44 |
| 2011/0131809 A1 | 6/2011 | Riddell et al. |

FOREIGN PATENT DOCUMENTS

| CN | 101648539 A | 2/2010 |
| EP | 2 239 459 A2 | 10/2010 |
| WO | 2006/061806 A2 | 6/2006 |
| WO | 2010/070388 A1 | 6/2010 |

* cited by examiner

*Primary Examiner* — Stephen Gordon
(74) *Attorney, Agent, or Firm* — Roberts Mlotkowski Safran & Cole, PC

(57) ABSTRACT

The invention relates to a method for transporting two or three pre-bend wind turbine blades for a wind turbine and to a wind turbine blade transport unit, the wind turbine blades each having a length extending from a first end, e.g. a root end describing a first end plane, to a second end, e.g. a tip end, where the length is at least 35 meters, the wind turbine blades each having a central longitudinal axis extending perpendicular from the first end plane and towards the second end, the wind turbine blade additionally having an aerodynamically shaped body having a pressure side, a suction side, a leading edge and a trailing edge. The wind turbine blades are fixed in specific positions in relation to one or two other wind turbine blades as a single transport unit.

4 Claims, 6 Drawing Sheets

TWO OR THREE WIND TURBINE BLADES AS ONE UNIT

FIELD OF THE INVENTION

The present invention relates to a method for transporting two or three pre-bend wind turbine blades for a wind turbine, said wind turbine blades each having a length extending from a first end, e.g. a root end describing a first end plane, to a second end, e.g. a tip end, where said length is at least 35 meters, said wind turbine blades each comprising a central longitudinal axis extending perpendicular from said first end plane and towards said second end, said wind turbine blade further comprises an aerodynamically shaped body comprising a pressure side, a suction side, a leading edge and a trailing edge. The method according to the invention for transporting two or three wind turbine blades comprises at least the following steps:
 arranging the two or three wind turbine blades with each of the first ends in the same direction,
 arranging the two or three wind turbine blades in an individual angular position about the individual central longitudinal axis of each wind turbine blade,
 arranging the first end/first end plane of each of the two or three wind turbine blades in an individual angular position in relation to a common plane,
 fixating a wind turbine blade in a specific position in relation to one or two other wind turbine blades as one single transport unit.

The invention further relates to a wind turbine blade transport unit comprising two or three pre-bend wind turbine blades, said wind turbine blades each having a length extending from a first end, e.g. a root end describing a first end plane, to a second end, e.g. a tip end, where said length is at least 35 meters, said wind turbine blades each comprising a central longitudinal axis extending perpendicular from said first end plane and towards said second end, said wind turbine blade further comprises an aerodynamically shaped body comprising a pressure side, a suction side, a leading edge and a trailing edge. A wind turbine blade transport unit according to the invention comprises a first end support frame, said first end support frame comprising means for fixating the first end of each wind turbine rotor blade against rotational movement about the longitudinal axis, against longitudinal movement and against angular movement of the first end in relation to said first end support frame.

BACKGROUND OF THE INVENTION

It is well known to transport wind turbine blades one by one on trucks and by ship. It has also been common to transport more than one wind turbine blade on e.g. the same truck. But as the wind turbines grow larger and larger also the wind turbine blades have become wider and longer, and in 1997 wind turbine blades having the tip end pointed forward and into the wind was invented. Wind turbine blades with this feature are commonly known as pre-bend wind turbine blades, as the unloaded blade is curved.

When a pre-bend blade during use is loaded, it will be straightened, instead of swept back, and this will allow the rotor to be arranged closer to the tower and still maintain a reasonably tip to tower distance. The tip to tower distance is actually the main advantage of the pre-bend blades, and over time this has more or less become the standard for modern and large wind turbine blades. Especially when talking about wind turbine blades having a length of more than 35, 40, 45 or even more than 50 meters.

One disadvantage using pre-bend blades is however very clear when it comes to transportation, especially by road. As the blades no longer are as straight as they used to be, they take up considerably more space in both the width direction and in the height direction. This has been handled in various manners, but one very used method has been to transport such pre-bend wind turbine blades one by one using a truck with a flatbed trailer and a following safety car.

The term flatbed trailer is to be understood as a general term comprising the various types of trailers having a more or less flat carrier surface including Drop Deck, Double Drop Deck, Step Deck and other types of trailers.

The blades are transported one by one by a truck on a flatbed trailer, and if the blades have to be shipped, they will be transported to the harbour using trucks as described, and the blades will be hoisted onto the ship and secured to the deck one by one. The wind turbine blades will typically be fitted with a frame or a foot at the root end and further there will typically be some kind of support structure at the outermost portion of the blade e.g. at ⅔ of the blade length when measured from the root end.

As the wind turbine blades often have to be transported quite some distance, and as such transports only carry one wind turbine blade per truck followed by a safety car, there will typically be a need for three independent trucks and safety cars per wind turbine. This will of course induce considerable costs.

It is thus interesting to optimise such transports in general with regard to the costs but also with regard to efficiency, meaning the time spent per transported wind turbine blade. One further problem to be addressed is the place taken up by the wind turbine blades during transport by road but also by ship.

OBJECT OF THE INVENTION

It is an object of the invention to provide a solution, i.e. a method for transporting pre-bend wind turbine blades in a manner optimised regarding time spent per transported wind turbine blade and regarding the costs per wind turbine blade and regarding the space required for such transport. Further it is an object of the invention to provide a transportation frame for two or three pre-bend wind turbine blades as one unit.

DESCRIPTION OF THE INVENTION

As mentioned above the invention relates to a method for transporting two or three pre-bend wind turbine blades for a wind turbine, said wind turbine blades each having a length extending from a first end, e.g., a root end describing a first end plane, to a second end, e.g. a tip end, where said length is at least 35 meters, said wind turbine blades each comprising a central longitudinal axis extending perpendicular from said first end plane and towards said second end, said wind turbine blade further comprises an aerodynamically shaped body comprising a pressure side, a suction side, a leading edge and a trailing edge wherein said method for transporting two or three wind turbine blades comprises at least the following steps:
 arranging the two or three wind turbine blades with each of the first ends in the same direction,
 arranging the two or three wind turbine blades in an individual angular position about the individual central longitudinal axis of each wind turbine blade,
 arranging the first end/first end plane of each of the two or three wind turbine blades in an individual angular position in relation to a common plane, fixating a wind turbine blade in a specific position in relation to one or two other wind turbine blades as one single transport unit.

Further, as also mentioned above, the invention also relates to a wind turbine blade transport unit comprising two or three pre-bend wind turbine blades, said wind turbine blades each having a length extending from a first end, e.g., a root end describing a first end plane, to a second end, e.g., a tip end, where said length is at least 35 meters, said wind turbine blades each comprising a central longitudinal axis extending perpendicular from said first end plane and towards said second end, said wind turbine blade further comprises an aerodynamically shaped body comprising a pressure side, a suction side, a leading edge and a trailing edge wherein said transport unit comprising two or three wind turbine blades further comprises a first end support frame, said first end support frame comprising means for fixating the first end of each wind turbine rotor blade against rotational movement about the longitudinal axis, against longitudinal movement and against angular movement of the first end in relation to said first end support frame.

The method according to the invention for transporting two or three pre-bend wind turbine blades further includes the following steps:
  arranging a first wind turbine blade with the suction side facing in a first direction towards a first plane,
  arranging a second wind turbine blade with the leading edge facing in the first direction towards the first plane, both the first and second wind turbine blade being arranged at or next to said first plane.

By arranging the wind turbine blades with the root end/first end located at the same end of a unit comprising two or three pre-bend blades it is possible to have the main weight of a transport unit concentrated at that end. This will allow for use of a standard flat bed trailer, where the blades and the transport unit can be arranged with the root end at the front end of a trailer and with at least a part of the blades extending from the rear end of said trailer, i.e. in a cantilever style. It is thus not necessary to use a flat bed trailer or the like capable of carrying or even supporting the blades along the complete length. This is highly appreciated as the blades very often can have a length of 35 to 40 meters or even up to 75 meters these days—and they will certainly become even longer. The trailer used can thus be considerably shorter than the blades and thus also a lot easier to manoeuvre on ordinary roads without having too much trouble as the wheelbase of course is shorter that by conventional transports where the wind turbine blades are supported along practically all their length.

Further the two or three wind turbine blades are arranged in an individual angular position about the individual central longitudinal axis of each wind turbine blade in relation to the one or two other blades. This is another important feature, as the blades typically are pre-bend as mentioned above. By arranging the blades in an individual angel about the longitudinal axis it is possible to arrange each blade in an optimal position in order to merge or braid the pre-bend blades and thus obtain a more compact transport unit. This will be discussed further below and examples will be given.

In order to perform an optimum merging/braiding of the wind turbine blades it is possible to arrange the first end/first end plane of each of the two or three wind turbine blades in an individual angular position in relation to a common plane. This means that the individual blades (more precisely the central longitudinal axis) can have an individual direction that allows for the desired merging/braiding.

After having arranged the wind turbine blades in an attractive position they will be fixed in that specific position in relation to the one or two other wind turbine blades as one single transport unit. Such a fixation will typically be performed by securing the individual blades to a common frame, where said frame comprises means for fastening the blades in both the longitudinal and the rotational direction. This can e.g. be done by interacting with means in the root end of the blades for fastening said blades at a hub of a wind turbine. The root ends will typically comprise a number of steel bushings with an internal tread for bolts or other means for connection to a hub, to a pitch system or to other means on the turbine. Said means are constructed to carry the weight of the blades and also the loads from the wind, and they will most certainly also be capable of holding the blade in position during transport.

As the blades are arranged with the longitudinal axes in individual directions, e.g. with a few degrees difference, the frame to which they are fixated can have a flange or receiving means with an angle that is specific to the individual blades in order to have a full support of the blade at the root end/first end and the plane described by said end.

In an embodiment of the invention the first end of two or three blades can be arranged at mainly the same lengthwise position, or alternatively within 0 to 8 meters, or 0 to 5, or 0 to 3 or within 0 to 1 meters, where one or more of said blades are arranged offset in a longitudinal direction in relation to one or more other blades, but still having the first ends in or near one end of a unit and the second ends in or near another end of a unit. By arranging the root ends of the blades in an offset position it becomes possible to optimise the transport unit according to flatbed trailers of the Drop Deck and Double Drop Deck types, where there is a difference in the height of the carrier surface of the trailer at the front end and also at the back end when it comes to the Double Drop Deck type. An example of a transport unit comprising three wind turbine blades on a Drop Deck trailer will be seen in the figures.

As mentioned above the invention comprises that said transport unit comprising two or three pre-bend wind turbine blades further comprises a first end support frame, said first end support frame comprising means for fixating the first end of each wind turbine rotor blade against rotational movement about the longitudinal axis, against longitudinal movement and against angular movement of the first end in relation to said first end support frame.

A method for transporting two or three pre-bend wind turbine blades according to the invention further comprises fixating said first end of each wind turbine blade to a first end support frame, where each blade is fixed against:
  rotational movement about the longitudinal axis,
  longitudinal movement and against
  angular movement of the first end in relation to said common plane.

As mentioned the invention comprises that said wind turbine blade is a pre-bend wind turbine blade. Especially transportation of pre-bend blades has become more and more difficult due to the increasing length of the blades, but also due to wider blades and even more pre-bending than the earlier and shorter blades had.

By arranging two wind turbine blades like described above and as also seen in FIGS. 5 and 6, the two blades are arranged more or less having an internal rotational relationship of about 90 degrees (could also be between approximately 60 to 120, 70 to 110 or 80 to 100 degrees), which will allow for the blades to be positioned relatively close to each other and still leave space and room for the pre-bend parts not to get in unnecessary contact.

Further a method according to the invention can also include the following step:

arranging a third wind turbine blade with the leading edge facing in the first direction towards the first plane, where said third wind turbine blade is arranged offset in relation to the first and second wind turbine blade and said first plane, and where said third wind turbine blade is arranged at a position between said first and second wind turbine blade. The third blade is more or less placed in the same manner as the second blade, i.e. with 0 or only a relatively few degrees difference, e.g. 5, 10, 15 or 20 degrees difference, but preferably with the longitudinal axis in an angled position to allow the tip of the blade to be merged/braided with the two other tip ends in order to optimise the size of the transport unit. Seen from the first end of the blades they will form a triangle and allow for the width and the height to be optimised according to specific needs. In principle the formed triangle can be oriented in any direction. Examples will be given in the detailed description.

Yet a further method according to the invention includes the following step:

arranging a third wind turbine blade with the pressure side facing in the first direction towards the first plane, where said third wind turbine blade is arranged offset in relation to the first and second wind turbine blade and said first plane, and where said third wind turbine blade is arranged at a position between said first and second wind turbine blade. The third blade is more or less placed rotated 90 degrees to the second blade (could also be between approximately 60 to 120, 70 to 110 or 80 to 100 degrees), and possibly with the longitudinal axis in an angled position to allow the tip of the blade to be merged/braided with the two other tip ends in order to optimise the size of the transport unit. Seen from the first end of the blades they will form a triangle and allow for the width and the height to be optimised according to specific needs. In principle the formed triangle can be oriented in any direction. Examples will be given in the detailed description.

The method according to the invention can also comprise arranging a support structure at a distance from the first end of the wind turbine blades, where said support structure comprise one piece or several pieces, arranged between and possible also around the two to three blades in a transport unit. Said structure can e.g. be made from a foam material such as polystyrene, which will support the blades and also prevent the blades from getting into damaging contact with each other. The structure can be made from other materials as well e.g. wood, and also from combinations of e.g. foam and wood. One object to bear in mind is that the structure needs to have a reasonable weight. Further the areas on such a structure, which comes in contact with the surface of the blades, need to be of a nature that will perform no impact but still a sufficient support, which makes polystyrene foam a straight forward choice. Even further such a structure can be used as support for a fastening strap for fixating the blades to a trailer and/or to each other.

A wind turbine blade transport unit according to the invention may comprise a first end support frame, where such a support frame can comprise a structure, e.g. a lattice structure, and at least one fastening bracket per wind turbine blade, said structure and fastening brackets are arranged for engaging with fastening means at the first end of each wind turbine blade, e.g. with fastening means for fastening said wind turbine blade to the wind turbine. This can as mentioned be steel bushings or inserts in the root end area of the blades that is used as they are present and dimensioned to overcome operational loads higher than the loads that will occur during transport.

In an embodiment of a wind turbine blade transport unit according to the invention said means on said first end support frame of the transport unit comprises a structure, said structure comprising at least one set of holes for each wind turbine blade, where said holes are arranged for aligning with fastening means at the first end of each wind turbine blade, e.g. with fastening means for fastening said wind turbine blade to the wind turbine. In other words: the support frame can have a number of holes arranged to be aligned with corresponding holes in the root end of the blade and in which a number of bolts can be installed to secure the blade in a specific rotational, longitudinal and angular (angle of the central longitudinal axis) position.

In an embodiment of a wind turbine blade transport unit according to the invention said first end support frame comprises one portion for each wind turbine blade to be arranged in said wind turbine blade transport unit, where such a portion is arranged with an individual angle in relation to at least one further portions on the same first end support frame. This allows for the individual blades to be arranged with a different or individual angle of the longitudinal axis.

By arranging transport units this way, the individual position of the blades in relation to one or two other blades, can be taken care of with respect to the width, the height and also to how close the respective blades are arranged to each other along the length. As wind turbine blades are very well documented structural parts and by using modern computer equipment it is quite easy to calculate/plan the position of the individual blades in relation to each other and hereby obtain a very compact and solid unit comprising two or three pre-bend wind turbine blades.

In one embodiment a wind turbine blade transport unit according to the invention has an overall width of 4700 millimeters or less and an overall height of 4800 millimeters or less, where the height is measured from a road level and includes a trailer, e.g. a flat bed trailer or another kind of carrier. These limits can of course be adjusted in order to fulfill national requirements and according to the height of a specific trailer and in some situations such a transport unit can be made more wide, more narrow, higher or lower.

A blade transport unit as described above is advantageous in different countries, where a cost-effective and time optimised solution is needed. By arranging the blades in a transport unit as described, three blades for a typical wind turbine or two blades for e.g. a partial pitch wind turbine can be transported as a single unit using standard transport equipment for road transport. Such a transport unit and a method according to the invention are indeed suitable for the Chinese wind turbine marked.

A standard trailer having a length of e.g. 27 meters can without any problems be used for transporting a transport unit according to the invention comprising three wind turbine blades each having a length of 35 to 40 meters or even longer. The first end being the root end of the blades is arranged at the front end of the trailer, and in the area near the rear end of the trailer the blades are supported by suitable means and will stretch as a cantilever from the trailer. As the free end being the tip end of the blades is much lighter than the root end, transport is problem-free.

A wind turbine blade transport unit according to the invention may comprises a support structure, said support structure comprising one or more surfaces corresponding to the surface of one, two or three wind turbine blades, said surfaces being arranged in a specific pattern corresponding to the individual position of one or more blades arranged in a transport unit.

Such a support structure/means can be arranged at one or more areas along the length of the blades for supporting the blades. Such means can e.g. be made from polystyrene or another kind of support material that can be arranged in contact with the surface of the blades. The support means can be made in one piece or in one piece per blade and can comprise a part that is embedded between the blades, but also a part facing outwards from the blade where a transport strap can be used to fixate the respective blades to each other via the support means.

The invention can be described as a virtual box surrounding the two or three wind turbine blades, where said virtual box together with the trailer has a size that is allowable to transport by road in the specific location.

DESCRIPTION OF THE DRAWING

An embodiment of the invention will now be described by way of example only and with reference to the accompanying drawings, in which.

Figure 1:
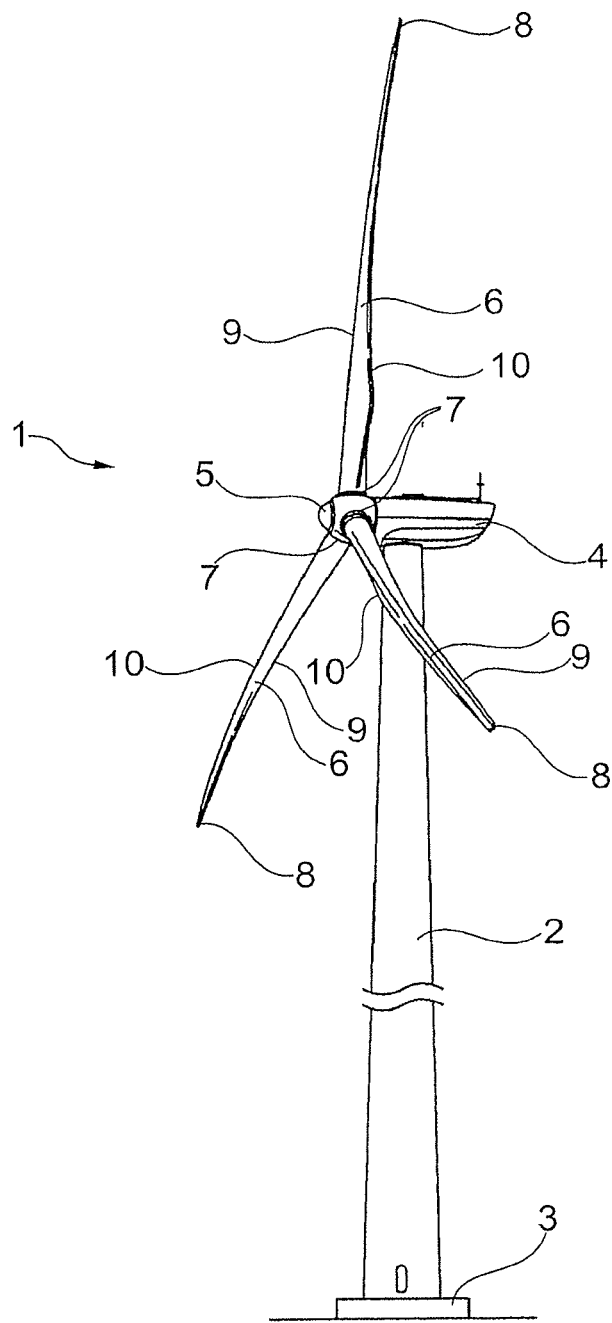
FIG. 1 shows a wind turbine with three blades.

In the following text the figures will be described one by one, and the different parts and positions seen in the figures will be numbered with the same numbers in the different figures. Not all parts and positions indicated in a specific figure will necessarily be discussed together with that figure.

POSITION NUMBER LIST

1 Wind turbine
2 Tower
3 Foundation
4 Nacelle
5 Hub
6 Wind turbine blade
7 First end of blade/root end of blade
8 Second end of blade/tip end of blade
9 Leading edge
10 Trailing edge
11 Truck
12 Trailer
13 Transport unit
14 Support frame
15 Fastening strap
16 Root flange with boltholes
17 Boltholes/fastening means
18 Central longitudinal axis
19 Fastening bracket
20 Suction side
21 Pressure side
22 First direction
23 First plane
24 B—width
25 H—height

DETAILED DESCRIPTION OF THE INVENTION

In FIG. 1 a typical wind turbine 1 is seen comprising a tower 2 installed at a foundation 3. At the top of the tower 2 a nacelle 4 comprising e.g. a gearbox, a generator and other components is seen. At the nacelle 4 there is also installed a shaft for carrying a rotor comprising a hub 5 and three wind turbine blades 6. The blades 6 are arranged at the hub 5 at a first end 7 called the root end of the blade 6. The second end 8 of the blades 6 constitutes a tip end. The wind turbine blades 6 all comprise an airfoil shaped body comprising a leading edge 9 and a trailing edge 10 extending along the wind turbine blade 6.

Figure 2:
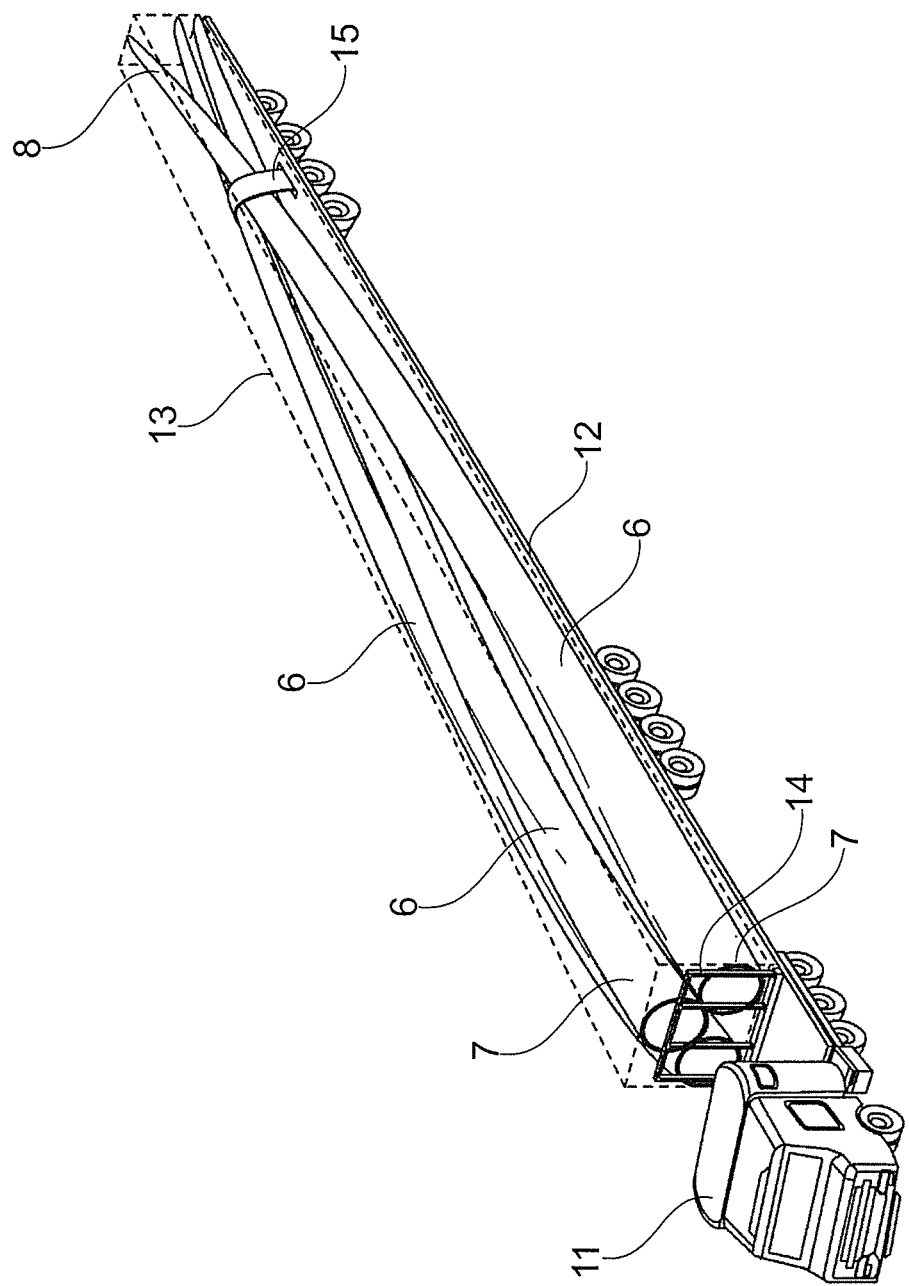
FIG. 2 shows a truck with a flatbed trailer carrying three wind turbine blades in a first configuration.

FIG. 2 shows a truck 11 with a flatbed trailer 12 carrying three wind turbine blades 6 arranged in a first configuration in a transport unit 13. The transport unit 13 constitutes a virtual box 13 with all the blades 6 having the first end 7 at one end and with the second end 8 of the blades 6 at the other end. At the first end 7 the blades 6 are fastened to a support frame 14, and near the second end 8 the blades 6 are fixated by a fastening strap 15 which holds the transport unit 13 in place on the trailer 12. The fastening strap 15 can be arranged on a support structure e.g. a polystyrene foam block, that is arranged between the blades 6 and thus supports the blades 6 and holds them in place.

Figure 3:
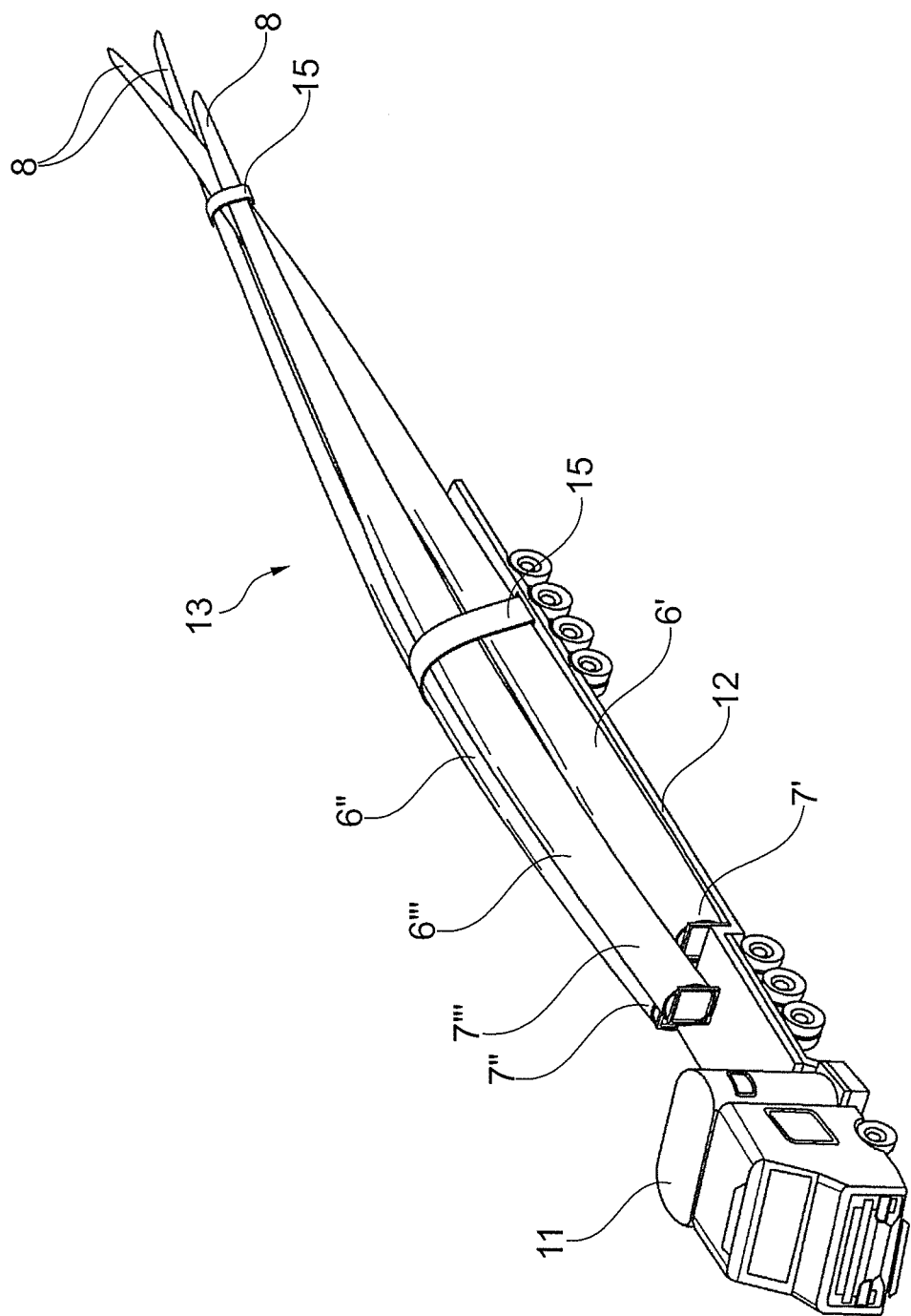
FIG. 3 shows a truck with a flatbed trailer carrying three wind turbine blades in a second configuration.

FIG. 3 also shows a truck 11, but here seen with a Drop Deck trailer 12, where the two lower wind turbine blades 6', 6" are arranged with the first end 7', 7" near the step on the trailer deck and with the third blade 6'" having the first end 7'" closer to the cabin of the truck 11. Such a configuration of a transport unit 13 can be advantageous depending on the specific shape of the blades 6. Further FIG. 3 shows that the transport unit 13 is longer than the trailer 12 and that the blades are fixated to the trailer 12 with a fastening strap 15 and interconnected near the second end 8 of the blade 6 with another fastening strap 15. In this figure the transport unit 13 is seen with one end extending from the rear end of the trailer 12 in a cantilever style, which makes the transport easier to manoeuvre on ordinary roads when comparing to the transport as seen in FIG. 2. Between the blades 6 at or near the fastening straps 15 a support structure, e.g. a block of foam can be arranged and used to support the blades 6 and the transport unit 13 in general.

Figure 4:
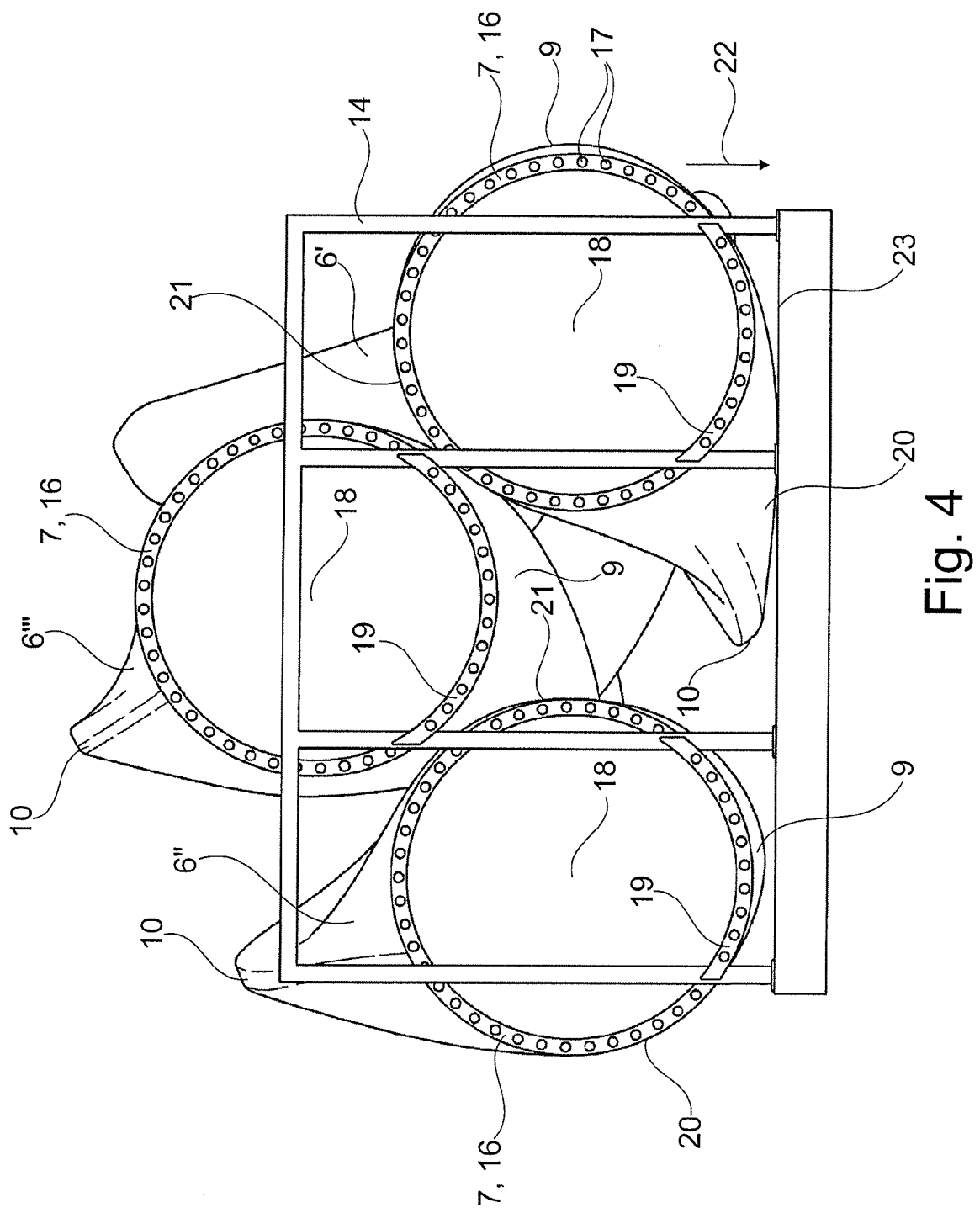
FIG. 4 shows three wind turbine blades fixated to a first end support frame.

FIG. 4 shows three wind turbine blades 6 fixated to a first end support frame 14. The first end 7 of the blades 6 comprises a root flange 16 with boltholes 17 intended for fastening the blade 6 to the hub 5 of a wind turbine 1. The central longitudinal axis 18 of the blades 6 is defined as an axis in the centre of the root flange 16, where the axis extends perpendicular to said root flange 16. The blades 6 are fastened to the support frame 14 by means of fastening brackets 19 that via not seen bolts are fixated around the lattice structure of the support frame 14 to the boltholes 17 in the root flange 16.

In FIG. 4 the first wind turbine blade 6' is arranged with the suction side 20 facing in a first direction 22 towards a first plane 23, said first plane 23 being horizontal in this specific situation. The second wind turbine blade 6" is arranged with the leading edge 9 facing in the first direction 22 towards the first plane 23, both the first 6' and second 6" wind turbine blade being arranged side by side. The first blade 6' having the suction side 20 facing down, the pressure side 21 facing up and consequently the leading edge 9 facing right and the trailing edge 10 facing left. The second blade 6" has the suction side 20 facing left, the pressure side 21 facing right and consequently the leading edge 9 facing down and the trailing edge 10 facing up. By arranging two wind turbine blades 6 like described above and as also seen in FIGS. 5 and 6, the two blades 6', 6" are arranged more or less having an internal rotational relationship of about 90 degrees (could also be between approximately 60 to 120, 70 to 110 or 80 to 100 degrees), which will allow for the blades 6', 6" to be positioned relatively close to each other and still leave space and room for the pre-bend parts not to get in unnecessary contact.

The third wind turbine blade 6''' is arranged with the leading edge 9 facing in the first direction 22 towards the first plane 23, where said third wind turbine blade 6''' is arranged offset in relation to the first 6' and second 6" wind turbine blade and said first plane 23. The third wind turbine blade 6''' is arranged at a position above and between the first 6' and second 6" wind turbine blade. The third blade 6''' is more or less placed in the same manner as the second blade 6", i.e. with 0 or only a relatively few degrees difference, e.g. 5, 10, 15 or 20 degrees difference, but preferably with the longitudinal axis 18 in an angled position to allow the second end 8 of the blade 6''' to be merged/braided with the second ends 8 of the first 6' and second 6" blade ends in order to optimise the size of the transport unit 13. This is seen in FIG. 6.

Figure 5:
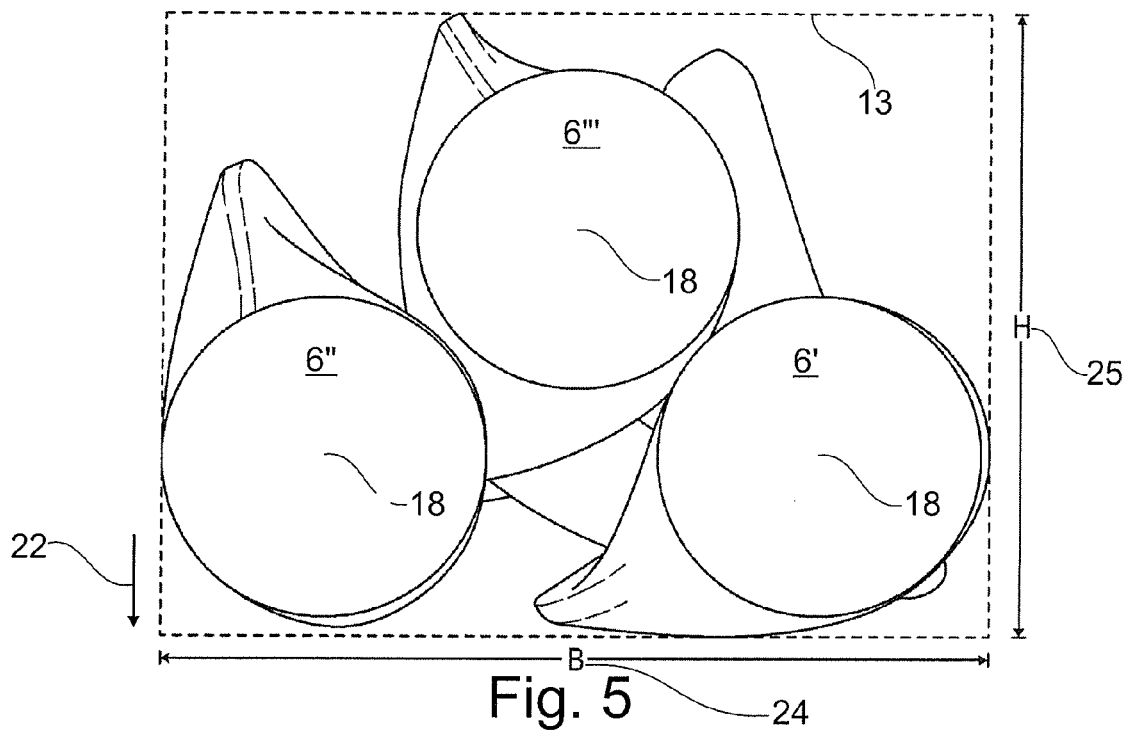
FIG. 5 shows the root end of three wind turbine blades in a first arrangement.

FIG. 5 shows the root end 7 of three wind turbine blades 6 in the same arrangement as seen in FIG. 4, where the width 24 of the transport unit 13 is illustrated with a B and the height 25 of the transport unit 13 is illustrated with H.

Figure 6:
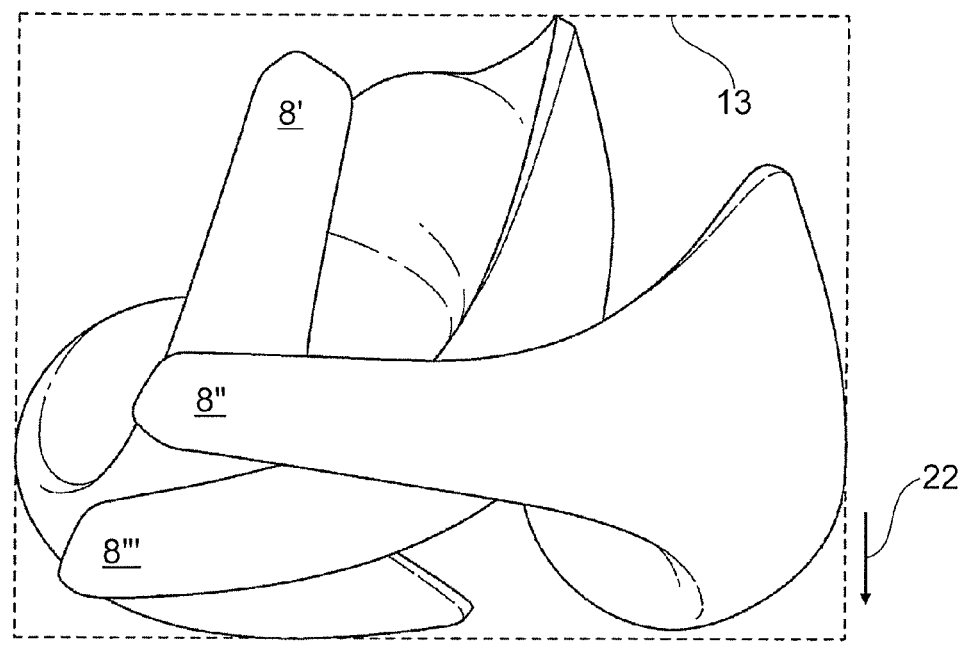
FIG. 6 shows the tip end of three wind turbine blades in a first arrangement.

FIG. 6 shows the second end 8 of three wind turbine blades 6 in the same arrangement as seen in FIGS. 4 and 5. Here it becomes visible that the individual blades 6 need to be arranged in a very specific manner in order to prevent them from interfering with each other. With reference to the longitudinal axis 18 of the first 6' and the second 6" blade the longitudinal axes are mainly in the same direction, but the longitudinal axis 18 of the third blade 6''' is pointing downwards in order to arrange the third blade end 8''' merged or braided with the first 8' and second blade 8" ends as depicted in FIG. 6.

Figure 7:
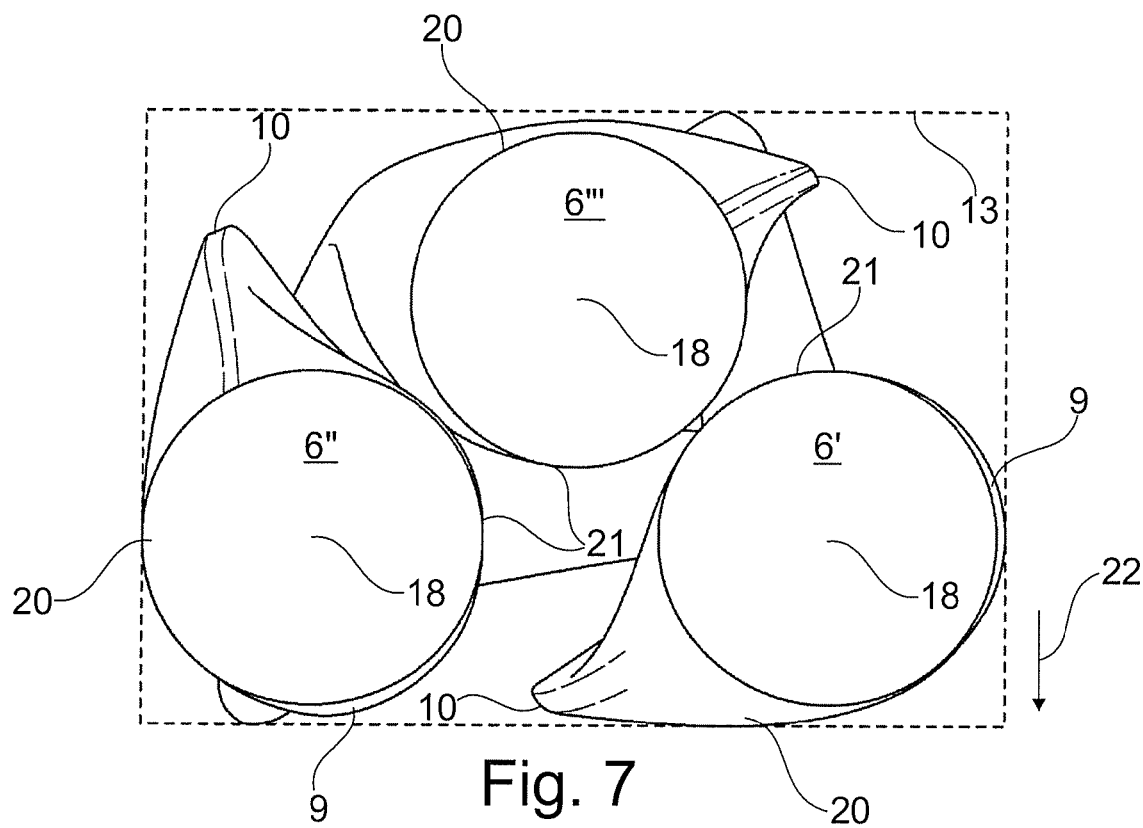
FIG. 7 shows the root end of three wind turbine blades in a second arrangement.

In FIG. 7 the root ends 7 of three wind turbine blades 6 are seen in a second arrangement, where the first 6' and second 6" blades are arranged as also seen in FIGS. 4, 5 and 6, but the third wind turbine blade 6''' is arranged with the pressure side 21 facing in the first direction 22 towards the first plane 23, where said third wind turbine blade 6''' is arranged offset in relation to the first 6' and second 6" wind turbine blade and said first plane 23, and where said third wind turbine blade 6''' is arranged at a position between said first 6' and second 6" wind turbine blade. The third blade 6''' is more or less placed rotated 90 degrees to the second blade 6" (could also be between approximately 60 to 120, 70 to 110 or 80 to 100 degrees), and possibly with the longitudinal axis 18 in an angled position (up or down) to allow the tip 8''' of the blade 6''' to be merged/braided with the two other tip ends 8', 8" in order to optimise the size of the transport unit 13.

Figure 8:
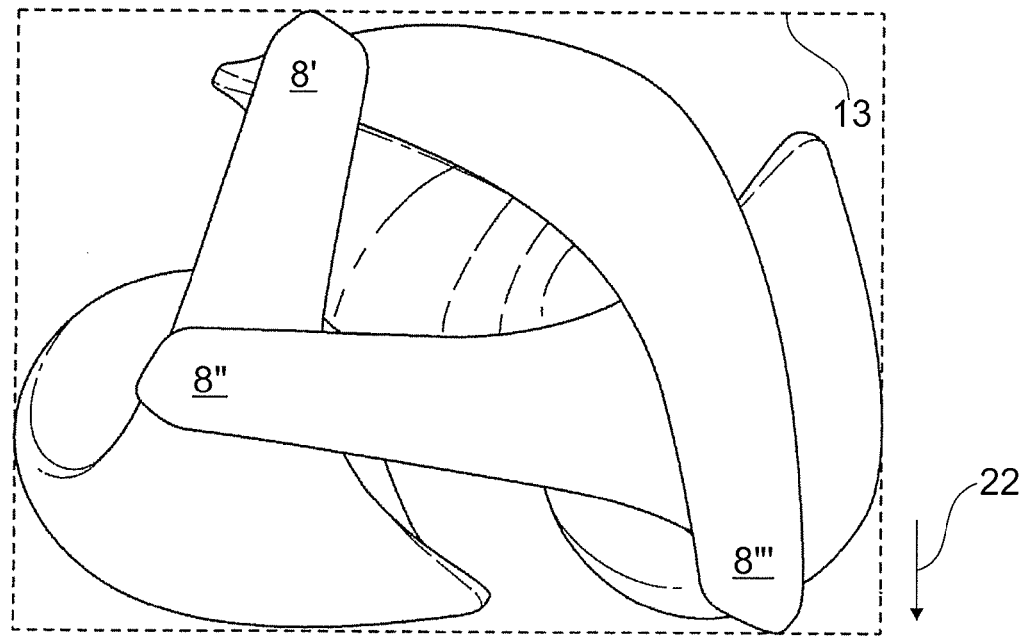
FIG. 8 shows the tip end of three wind turbine blades in a second arrangement.

FIG. 8 shows the tip end 8 of three wind turbine blades 6 in the same arrangement as seen in FIG. 7. Also here it becomes visible that the individual blades 6 need to be arranged in a very specific manner in order to prevent them from interfering with each other. With reference to the longitudinal axis 18 of the first 6', the second 6" and third 6''' blade the longitudinal axes are mainly in the same direction having mainly parallel longitudinal axes 18.

The invention is not limited to the embodiments described herein and may be modified or adapted without departing from the scope of the present invention as described in the patent claims below.

The invention claimed is:

1. A method for transporting two or three pre-bend wind turbine blades for a wind turbine, said wind turbine blades each having a length extending from a first end, to a second end, where said length is at least 35 meters, each of said wind turbine blades comprising a central longitudinal axis extending perpendicular from said first end and towards said second end, said wind turbine blade further comprises an aerodynamically shaped body comprising a pressure side, a suction side, a leading edge and a trailing edge wherein said method for transporting two or three wind turbine blades at least comprises the following steps:
    arranging the two or three wind turbine blades with each of the respective first ends facing in the same direction,
    arranging each of the two or three wind turbine blades in an individual angular position about the respective central longitudinal axis of each wind turbine blade,
    arranging the first end of each of the two or three wind turbine blades in an individual angular position in relation to a common plane,
    fixing one of the wind turbine blades in a specific position in relation to the one or two other wind turbine blades as a single transport unit wherein said method further includes the following steps:
    arranging a first of the wind turbine blades with its respective suction side facing in a first direction towards a first plane,
    arranging a second of the wind turbine blades with its respective leading edge facing in the first direction towards the first plane, both the first and second of the wind turbine blades being arranged at or next to said first plane.

2. A method according to claim 1, wherein said method further includes the following step:
    arranging a third of the wind turbine blades with its respective leading edge facing in the first direction towards the first plane, where said third of the wind turbine blades is arranged offset in relation to the first and second of the wind turbine blades and said first plane, and where said third of the wind turbine blades is arranged at a position between said first and second of the wind turbine blades.

3. A method according to claim 1, wherein said method further includes the following step:
    arranging a third of the wind turbine blades with its respective pressure side facing in the first direction towards the first plane, where said third of the wind turbine blades is arranged offset in relation to the first and second of the wind turbine blades and said first plane, and where said third of the wind turbine blades is arranged at a position between said first and second of the wind turbine blades.

4. A method according to claim 1, wherein said method for transporting two or three pre-bend wind turbine blades further comprises fixing said first end of each wind turbine blade to a first end support frame, wherein each blade is fixed against:
    rotational movement about the longitudinal axis,
    longitudinal movement and
    angular movement of the first end in relation to a common plane.

* * * * *